United States Patent [19]

Sprick et al.

[11] 4,340,964
[45] Jul. 20, 1982

[54] METHOD AND AN ARRANGEMENT FOR AUTOMATIC ACCESS OPTIMIZATION IN RANDOM ACCESS MEMORIES

[75] Inventors: Erhard Sprick; Rudolf Kaiserswerth, both of Munich, Fed. Rep. of Germany

[73] Assignee: Siemens Aktiengesellschaft, Berlin and Munich, Fed. Rep. of Germany

[21] Appl. No.: 158,116

[22] Filed: Jun. 10, 1980

[30] Foreign Application Priority Data

Jun. 27, 1979 [DE] Fed. Rep. of Germany ....... 2925966

[51] Int. Cl.³ .............................................. G06F 11/10
[52] U.S. Cl. ..................................................... 371/38
[58] Field of Search ..................................... 371/38, 37

[56] References Cited

U.S. PATENT DOCUMENTS

| | | | |
|---|---|---|---|
| 4,030,067 | 6/1977 | Howell et al. | 371/38 |
| 4,112,502 | 9/1978 | Scheuneman | 371/38 |
| 4,171,765 | 10/1979 | Lemone | 371/38 |
| 4,241,446 | 12/1980 | Trubisky | 371/38 |

FOREIGN PATENT DOCUMENTS 2549392 of 0000 Fed. Rep. of Germany .

Primary Examiner—Charles E. Atkinson
Attorney, Agent, or Firm—Hill, Van Santen, Steadman, Chiara & Simpson

[57] ABSTRACT

For the purpose of automatic adaptation of the time of release of a data word, which has been read from a random access memory equipped with an error correction device, the error syndrome is monitored. If the value of the syndrome does not deviate from zero for a prescribed duration, then a signal is generated which designates the read data as being valid. The mean access time with respect to the data release, taken into consideration the most unfavorable conditions, can thereby be substantially reduced. A zero detector generates an interpretation signal which characterizes the value zero of the syndrome. A monitoring circuit is provided which, subsequent to a time delay via a delay line, relative to the beginning of a read start signal triggering a read cycle, becomes active and emits a release signal if the interpretation signal has not deviated from the logic value "1" during the monitoring time interval. A logic element is provided for alternate linkage of the release signal or a signal indicating the successful conclusion of the correction of a data word subjected to error.

10 Claims, 4 Drawing Figures

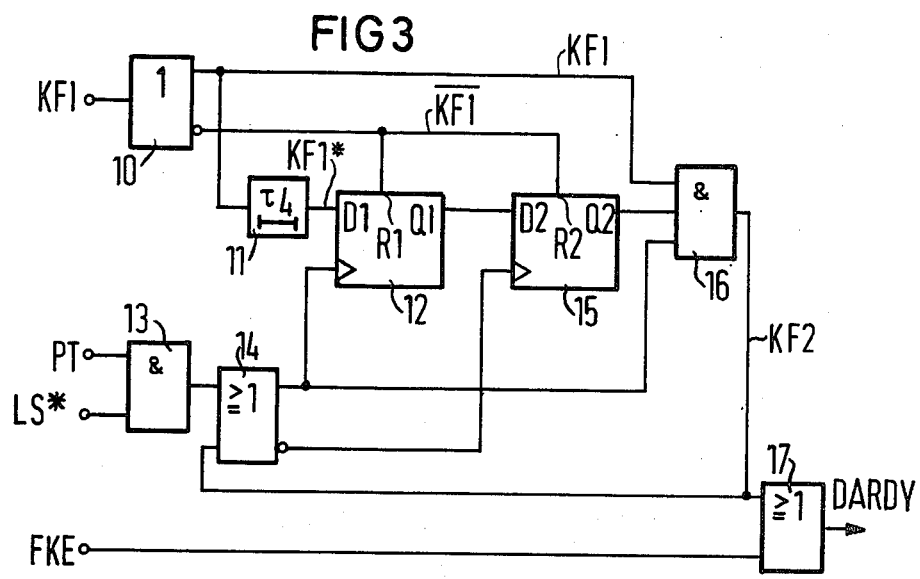
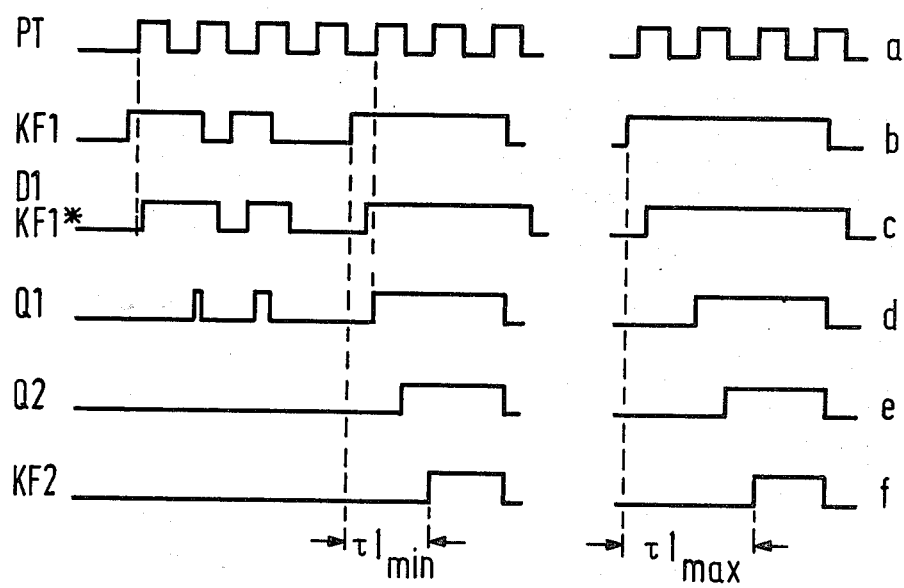

METHOD AND AN ARRANGEMENT FOR AUTOMATIC ACCESS OPTIMIZATION IN RANDOM ACCESS MEMORIES

BACKGROUND OF THE INVENTION

1. Field of the Invention

The present invention relates to a method and to an apparatus for automatic access optimization during reading of data words from a random access memory, and in particular to the same utilizing an error correction device.

2. Description of the Prior Art

Larger random access memories, such as, for example, working memories of data processing systems are presently, virtually without exception equipped with installations for error correction. Error correction devices are known in the art in various embodiments (cf. e.g. the German published application No. 2,549,392 and the German published application No. 2,657,826 corresponding to U.S. Pat. No. 4,030,067). Common to all error correction devices is a syndrome generator or syndrome calculator which derives check bits from the data word to be written into the memory in accordance with a specific algorithm which is the basis of the correction code employed, the check bits being input into the memory together with the data word. Subsequent to the reading of a data word from the memory, check bits are again derived in accordance with the same specification and are compared with the check bits read from the memory. The comparison result is designated as a syndrome and represents an information regarding the error situation of the word read from the memory. It is zero if the data word is error-free. A syndrome deviating from zero indicates that errors have occurred. It depends upon the type of correction code employed, in particular upon its redundancy, i.e. upon the number of check bits added to the original data word, as to how many errors are still correctable in a data word and what number of errors can still be ascertained at all.

The assessment of all operations, in conjunction with an error correction, or error recognition, respectively, must be taken into consideration that the probability of the presence of error-free data words is greatest by far, and the probability of the simultaneous occurrence of errors decreases very rapidly with an increasing error number.

The access time in a memory is defined as the time interval between the connection of a read start signal, which initiates a read operation, and the appearance of the read data which become valid by means of a transfer signal at the interface. The time point for the occurrence of the read data validity signal (Dardy) must, as a rule, be geared to the slowest data path, which is composed of several individual components, of which the maximally possible access time for an individual memory cell within a random memory module is under the most unfavorable conditions and the maximum path for the drive signals and read signals are the most important. It is clear that, in this manner, time is frequently wasted. Nevertheless, an individual adaptation of the access time to the conditions actually present in the case of a concrete memory example is only rarely carried out, because, in the case of a possible necessary exchange of memory groups, most frequently new adjustment measures would have to be carried out.

SUMMARY OF THE INVENTION

The object of the present invention is to provide a method for automatic adaptation of the access time to the respectively prescribed, for example, dependent upon the address and the ambient conditions, data path and an arrangement for carrying out the method.

The above object is achieved in that the value, characterizing the error situation of the read data word, of the syndrome, generated by the error correction device, is monitored during a prescribed monitoring interval, whereby the monitoring interval begins again on the value of the syndrome deviates from zero prior to the expiration of a monitoring time interval. The read data word is released when the value of the syndrome during a monitoring time interval has not deviated from zero, or when the correction of an erroneous data word has been successfully concluded.

An arrangement for carrying out the method comprises a zero detector for generating an interpretation signal, characterizing the value zero of the syndrome, and provides a monitoring circuit which, subsequent to a delay time brought about by a delay line, relative to the beginning of a read start signal triggering a read cycle, becomes active and emits an enabling signal if the interpretation signal has not deviated from the logic value "1" during the monitoring time interval. A logic element is provided for the purpose of alternate linkage of the enabling signal or of a signal indicating the successful conclusion of the correction of a data word subjected to error.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 3 is a logic diagram representation of a circuit arrangement for monitoring the syndrome and generating the read data validity signal; and FIG. 4 is a timing diagram for explaining the operation of the circuit arrangement of FIG. 3.

DESCRIPTION OF THE PREFERRED EMBODIMENTS

Figure 1:
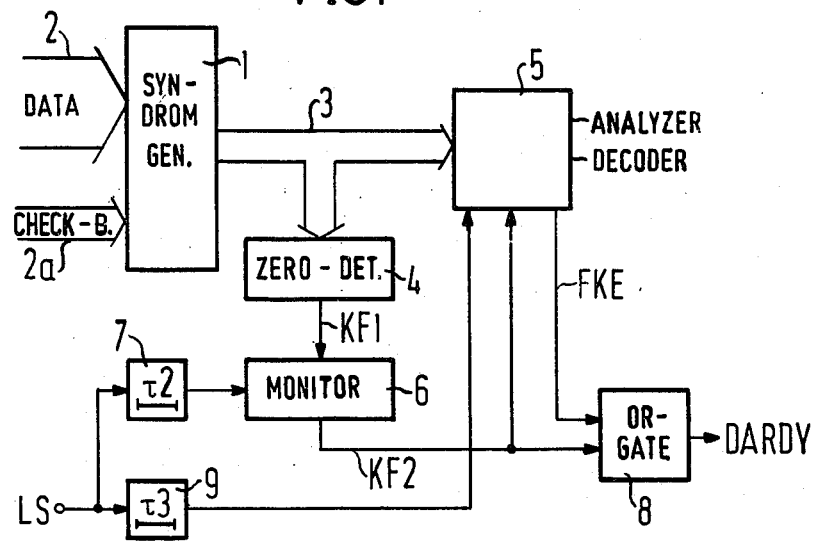
FIG. 1 is a logic block diagram of the decisive elements for carrying out the method of the present invention.

Referring to FIG. 1, a syndrome generator 1 is provided for generating syndromes from data words and check bits arriving by way of line groups 2 and 2a, in a manner known per se and described in the introduction. Details of the syndrome generator are therefore not illustrated in FIG. 1.

The syndromes are supplied, via a line group 3, to a zero detector 4, as well as to an analyzing and decoding circuit 5. The zero detector 4 represents a NOR circuit having a number of inputs corresponding to the number of syndrome bits. At the output of the zero detector 4 an interpretation signal KF1 having the logic value "1" always results when all bits of the syndrome are zero, i.e. when the syndrome altogether assumes the value zero. A syndrome different from zero, which results only when the read data word contains at least one error, is analyzed by the analyzing and decoding circuit 5. It is here first determined whether it is a question of correctable or non-correctable errors. In the first case, so-called error location signals are generated which, in conjunction with the correction network not illustrated in FIG. 1, effect the inversion of the bits, recognized as erroneous, within the read data word.

Since the individual bits of a data ready signal, because of the different data paths, arrive not only at the memory interface, but also at the zero detector 4 at various times, the zero detector 4 will first determine deviations from the value zero of a syndrome even when the read data word finally proves to be error-free. Therefore, if the value zero of the syndrome is to be employed as the criterion for the immediate data release, a time point must be awaited at which the value of the syndrome will, as a prospect, remain stable. One can proceed from the assumption that the data paths to the syndrome generator and to the memory interface are approximately equal.

The monitoring of the value zero of the syndrome, or of the interpretation signal KF1 which is dependent thereon, respectively, is carried out by a monitoring circuit 6. The monitoring circuit 6 is started by a signal LS* (FIG. 3), derived from the read start signal LS and delayed by the time $\tau 2$, whereupon the operational sequence of the fixed time interval $\tau 1$ begins. The monitoring circuit 6 is so designed that the operational sequence of the interrogation time $\tau 1$ is always newly started when the interpretation signal KF1 within a time span $\tau 1$ alternates at least once between zero and one. It must be taken into consideration here that it is also possible for such short pulses to occur at the output of the zero detector 4 that the following monitoring circuit no longer responds thereto. The minimum time $\Delta \tau$ of the still process pulses depends upon the specific type of monitoring circuit and upon the circuit technology employed. It is proven expedient, for the time $\Delta \tau$, to employ the minimum pulse duration for the resetting of a flip-flop. In the known emitter-coupled logic (ECL)-100k technology, it amounts, for example, to 2.6 ns.

It can be estimated that, in the case of a single sampling of the syndrome over the time interval $\Delta \tau$, in the statistical mean $f = z/2^k$ erroneous decisions per second are to be reckoned with, whereby z is the number of memory accesses per second and k is the number of check bits forming the redundancy in the correction code word. If one proceeds from $z = 300,000$ memory accesses per second and $k = 8$ check bits (single error correction 64 data bits), then the probable number of approximately 1200 erroneous decisions per second results, which, naturally, is an unsatisfactory value. However, it is shown that the erroneous decisions to be expected on the average decrease very rapidly with the number of syndrome samplings per memory access. With i samplings, there results $f = z/(2^k)^i$ error decisions.

With the previously employed values for z and k, in the case of $i = 6$ samplings, the probability of an erroneous decision amounts to $1.06 \times 10^{-9}$ per second. This corresponds to an erroneous decision in 30.3 years. With $k = 15$ check bits, which are required for a double error recognition in a data word with 64 bits, one obtains acceptable values for the probability of erroneous decisions already with fewer, for example $i = 3$, samplings of the syndrome per memory access. One then has to reckon with a error decision in 3.85 years.

The monitoring of the syndrome, or interpretation of the signal KF1, respectively, can occur by way of repeated individual samplings, or continuously. In the case of repeated individual sampling, the counting of the samplings begins anew if, in the case of the two last samplings, different values of the syndrome are ascertained. For the abovementioned time interval $\tau 1$, given a continuous sampling, $\tau 1 = i \cdot \Delta \tau$ is true. With the previously cited values for i and $\Delta \tau$, $\tau 1 = 15.6$ ns, or $\tau 1 = 7.8$ ns is calculated therefrom.

Figure 2:
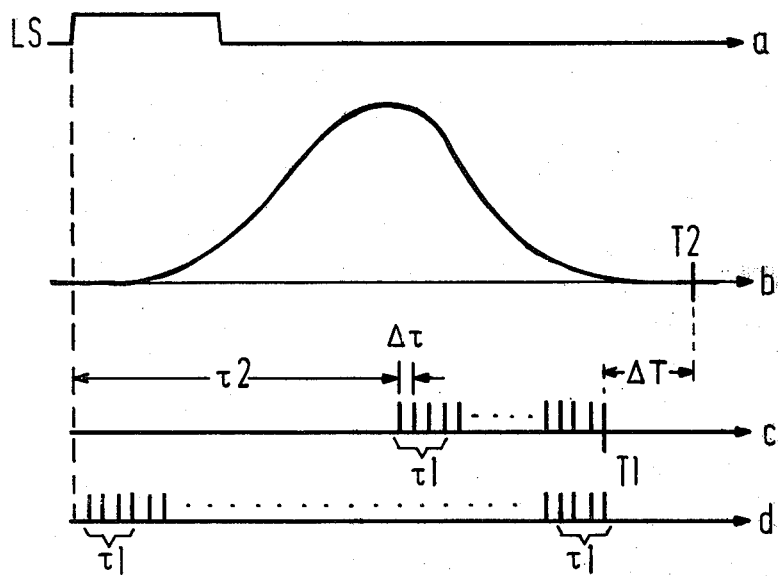
FIG. 2 is a timing chart illustrating the chronological operational sequence of some of the signals and the frequency distribution for the arrival of read output signals at the memory interface.

The first start for the sampling time interval $\tau 1$ will be advantageously located approximately at a time point at which the data signal arrives, with the greatest probability, at the memory interface and which is delayed by the time interval $\tau 2$ with respect to the beginning of the read start signal LS. This time point corresponds to the position of the maximum in the curve progression according to line B of FIG. 2. The curve progression illustrates the probability of the arrival of read data signals in dependence upon the time which has elapsed since the beginning of the read start signal LS according to line a. In line c, the repeated operational sequence of the sampling time $\tau 1$ is schematically illustrated until, finally, during a last time interval $\tau 1$, no deviation from the value zero of the syndrome has taken place. Now, at the time T1, the read data release can occur. The time span $\Delta T$ to the time point T2, at which the data release could take place at the earliest, taken into consideration the extreme conditions, is the attained access yield.

The first start for the operational sequence of the monitoring time $\tau 1$ could also simultaneously occur with the arrival of the read start signal LS. However, the prerequisite for this is that the bit combination present (read data not yet present) not generate a syndrome having the value zero. This can be prevented in that, prior to input into the memory, and, accordingly, after reading, individual check bits are inverted. In line d, this second possibility for monitoring of the syndrome is indicated. The delay $\tau 2$ of the read start signal LS, necessary in the first case, for triggering the monitoring circuit 6 by the delay circuit 7 is now completely or virtually eliminated.

As FIG. 1 shows, the monitoring circit 6 emits a release signal KF2 which then assume the logic value "1" when the syndrome, during the sampling time $\tau 1$, or in the case of i successive samplings, respectively, has not deviated from zero. In this case, the read data validity signal DARDY is generated by the arrangement 8.

It has already been mentioned that the analyzing and decoding circuit 5 analyzes a syndrome different from zero and decodes the same for the purpose of generating correction signals if the analysis indicates the correctability of the data words which have appeared. However, there would be no purpose in conducting an analysis, or in evaluating a possibly occurring analysis result as long as the syndrome cannot be regarded as stable with a satisfactorily high degree of probability. In order to guarantee this prerequisite, basically two possibilities are available.

The simplest possibility is the setting in operation of the analyzing and decoding circuit 5 only when, with certainty, all read signals have arrived at the memory interface, or at the syndrome generator 1, respectively. This corresponds to the time T2 of FIG. 2. The bridging of the time interval $\tau 3$ between the beginning of the read start signal and the time T2 occurs by way of a delay element (delay line) 9. It makes virtually no difference that, in this manner, possibly an unnecessarily long time is awaited until the start of the correction measures. A correction operation in particular, requires a comparatively great amount of time; above all, however, this instance seldom occur, measured against the overall number of read accesses.

It is also possible to monitor the syndrome analogously to the already described monitoring measures during the time interval $\tau 1$ as to any changes, whereby the time sequence is again started when changes are determinable. For this purpose, the binary values of all syndrome bits, which values are present at the beginning of the time interval $\tau 1$, must be stored, and possible changes in the binary values must be determined through comparison, for example with the aid of NOR circuits. This signifies a considerable increase in signal transit time, so that the time yield becomes minimal and the increased material becomes unprofitable.

In addition, the already described monitoring installation 6, which emits a signal KF2, if, during the time interval $\tau 1$, or in the case of i successive samplings of this syndrome, no deviation from the value zero has occurred, could also be employed for the determination that the syndrome was different from zero during the entire time. However, this would not yet signify that the syndrome was also actually stable during the monitoring time interval. Hence, this method would be too unreliable.

The initiation of correction measures (which, finally, would have no effect) is, of course, omitted if the syndrome is zero. For this purpose, the signal KF2 having a logic value "1" serves as the inhibiting signal for the analyzing and decoding circuit 5. If, by contrast, an error correction became necessary, then the analyzing and decoding circuit 5, subsequent to its termination, supplies an end signal FKE to the arrangement 8 which transmits the same as a read data validity signal DARDY.

FIG. 3 illustrates an exemplary embodiment of the monitoring circuit 6 according to FIG. 1. The circuit arrangement synchronizes the asynchronous interpretation signal KF1 with a periodic sampling clock pulse PT and masks out metastable conditions at flip-flops which can occur at that time.

An inverter 10 additionally delivers to the interpretation signal KF1 the relatively inverse signal $\overline{KF1}$. The signal $\overline{KF1}$, after a time delay $\tau 4$, brought about by a delay element 11, arrives at the information input D1 of a first D-flip-flop 12, and, upon arrival of the next-following rising pulse edge of the sampling clock pulse P, is transferred into the D-flip-flop 12. The through-connection of the sampling clock pulse PT is controlled, with the aid of an AND circuit 13, corresponding to the agreements regarding the initial start of the monitoring time $\tau 1$, by the read start signal LS* which is delayed in the delay element 7 (FIG. 1).

The information connected to the output Q1 of the first flip-flop 12 is transferred into a second D-flip-flop 15 by the following falling pulse edge of the sampling clock pulse PT, which appears again at the inverting output of an OR circuit 14 as a rising pulse edge. The output Q2 of the second flip-flop 15 is connected to an input of an AND circuit 16 at whose other inputs the interpretation signal KF1 and the sampling clock pulse T are connected. With a repeated pulse of the sampling clock pulse PT, the signal KFT occurs at the output of the AND circuit 16, and characterizes the observance of the value zero of the syndrome during the sampling interval $\tau 1$. The signal KF2 traverses the OR circuit 17 and forms at its output the read data validity signal DARDY. The signal KF2 maintains itself (latches) by way of the OR circuit 14 and the AND circuit 16, independently of the instantaneous state of the sampling clock pulse PT, until the interpretation signal KF1, as a consequence of repeated read access, disappears. Simultaneously, the flip-flops 12 and 15 are reset. As is immediately apparent from FIG. 3, the correction end signal FKE alternately leads to the generation of the read data validity signal DARDY.

The foregoing description of the monitoring circuit according to FIG. 3 assumes that the syndrome, from a specific time point to a repeated read access, has no longer deviated from the value zero. Actually, this assumption, generally, will initially not be satisfied. On the contrary, it can be assumed that the value of the syndrome will repeatedly alternate between zero and not equal to zero before the value zero becomes stable. The operational sequence of the monitoring time $\tau 1$ must then always begin again. In order to facilitate the overview of operations thus occurring, reference is made, for further explanation, to the timing diagram according to FIG. 4, which shows the chronological progression of the sampling clock pulse PT, the interpretation signal KF1, a signal KF1* (delayed KF1 connected to the information input D1 of the first flip-flop 12), the output signal at the output Q1 of the first flip-flop 12, the output signal at the output Q2 of the second flip-flop 15, and the release signal KF2.

The sampling clock pulse PT has a period $t_p$ which plays an important role for the dimensioning of the monitoring time $\tau 1$, as shall be evident from the description below. The interpretation signal KF1, during the phase in which the read data signals gradually arrive at the syndrome generator 1 (FIG. 1), has a purely chance progression; in particular, the changes of the signal occur entirely asynchronously. The progression of the interpretation signal KF1 in the timing diagram according to FIG. 4, therefore, could be arbitrarily assumed. The first transition of the interpretation signal KF1 from the logic value "0" to the logic value "1," lies shortly before a rising edge of the sampling clock pulse PT (by contrast, the corresponding transition of the delayed signal KF1* at the information input D1 lies shortly after the rising clock pulse edge. In the case of the following rising clock pulse edge, the first flip-flop 12 is, indeed, set, but is immediately again reset, because the interpretation signal KF1 disappears again. (KF1→1). Therefore, at the output Q1 of the first flip-flop 12 only a short pulse occurs which does not lead to the setting of the second flip-flop 15, since no falling edge of the sampling clock pulse PT has occurred during the period of the pulse. An analogous result occurs when the interpretation signal KF1 for the second time assumes the logic value "1."

The third transition of the interpretation signal KF1 from "0" to "1" is located before a rising edge of the sampling clock pulse PT in such a manner that the corresponding transition of the signal KF1* at the input D1 of the first flip-flop 12, which signal has been delayed in the delay element 11 by less than half a clock pulse period, takes place just barely prior to the clock pulse rising edge. The transfer into the first flip-flop 12 therefore occurs immediately. After a further half clock pulse period, the second flip-flop 15 is set, since the interpretation signal KF1 continues to assume the logic value "1." Again, half a clock pulse period later, the release signal KFT occurs which has immediately as a consequence the read data validity signal DARDY. The release signal KF2 maintains itself, due to the feedback via the OR circuit 14 and the AND circuit 16 until the interpretation signal KF1 disappears. The two flip-flops 12 and 15 are then also reset.

The time interval between the occurrence of the interpretation signal KF1 and the beginning of the release signal KF2 resulting therefrom, is the shortest possible monitoring time $\tau1_{min}$, because of the last-assumed chronological relation between the interpretation signal KF1 and the sampling clock pulse PT. The results in $\tau1_{min} = t_p + \tau4$ and, in the case of a syndrome comprising 8 bits, it is to amount to approximately 15 ns. If one sets approximately one third of the clock pulse period $t_p$ as the delay time $\tau4$, then the clock pulse period $t_p$ must amount to approximately 12 ns.

In the last section of the timing diagram of FIG. 4, which is not intended to be any continuation of the preceding section, it is assumed that the interpretation signal KF1 occurs somewhat later than previously in relation to the sampling clock pulse PT. The interpretation signal KF1*, delayed by the interval $\tau4$, may arrive at the input D1 of the first flip-flop 12 barely after the rising edge of the sampling clock pulse PT. Virtually a full clock pulse period $t_p$ then elapses until the transfer into the first flip-flop 12. As in the preceding example, it then once again takes an additional clock pulse period $t_p$ until the release signal KF2 results. From the transition of the interpretation signal KF1 from the logic value "0" to the logic value "1" until the occurrence of the release signal KF2, in the assumed example, the maximum monitoring time $\tau1_{max}$, $\tau1_{max} = 2t_p + \tau4$ has elapsed. With the previously cited values, $\tau1_{max}$ now results in approximately 28 ns. The period duration of the sampling clock pulse PT can be reduced approximately to half if, instead of 8 check bits, 15 check bits are provided.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for automatic access optimization in reading data words from a random access memory having an error correction device comprising the steps of:
   generating a syndrome having a value representing the error condition of a read data word;
   monitoring the value of the syndrome during a predetermined monitoring interval;
   when the syndrome value deviates from a prescribed value during the monitoring interval, repeating the monitoring interval; and emitting a data ready signal when the error condition of the read data word is at a predetermined condition.

2. The method of claim 1, wherein the step of emitting the data ready signal is further defined as:
   emitting the data ready signal when the syndrome value has not deviated from zero during the monitoring interval.

3. The method of claim 1, wherein the step of emitting the data ready signal is further defined as:
   emitting the data ready signal upon completion of correction of a correctible erroneous read data word.

4. The method of claim 1, comprising the steps of:
   generating clock pulses having a predetermined period;
   generating an interpretation signal representing a zero syndrome value and integrating the same into the clock pulses; and
   setting the monitoring interval as a function of the interpretation signal and the clock pulse period.

5. Apparatus for automatic access optimization in reading data words from a random access memory having an error correction device, comprising:
   means for generating a syndrome having a value representing the error condition of a read data word;
   means for monitoring the value of the syndrome during a predetermined monitoring interval and for repeating the monitoring interval when the syndrome value deviates from a prescribed value during the monitoring interval; and
   means for emitting a data ready signal when the error condition of the read data word is at a predetermined condition.

6. The apparatus of claim 5, wherein said means for emitting the data ready signal is further defined as:
   means for emitting the data ready signal when the syndrome value has not deviated from zero during the monitoring interval.

7. The apparatus of claim 5, wherein said means for emitting the data ready signal is further defined as:
   means for emitting the data ready signal upon completion of correction of a correctible erroneous read data word.

8. Apparatus for automatic access optimization of a random access memory having a correction device comprising a syndrome generator including a first input for receiving
   data words read from the memory, a second input for receiving check bits, and an output for emitting a syndrome;
   a detector connected to said output for producing an interpretation signal in response to a zero value of a syndrome;
   a delay circuit for receiving and delaying a read start signal for a predetermined interval;
   an analyzing and decoding circuit connected to said output of said syndrome generator for producing a correction completion signal; and
   a monitor connected to said detector and to said delay circuit and responsive to a delayed read start signal and an interpretation signal to emit a data ready signal when the syndrome value has not deviated from zero for a predetermined monitoring interval or in response to the correction completion signal.

9. The apparatus of claim 8, wherein said monitor further comprises:
   first and second clock pulse edge-controlled flip-flops connected in series and having respective clock pulse inputs, information inputs and outputs and common reset inputs;
   first means for providing inverted and non-inverted interpretation signals connecting inverted interpretation signals as reset signals to said reset inputs;
   a delay element connecting the non-inverted interpretation signals to said information input of said first flip-flop;

second means connected to feed inverted and non-inverted clock pulses to said clock pulse inputs so that said first flip-flop is operable to store information in response to a rising edge of a clock pulse and said second flip-flop has information transferred thereto in response to a rising edge of an inverted clock pulse; and third means connected to said second flip-flop, to said first means and to said second means for producing the data ready signal in response to said interpretation, information and clock pulse signals.

10. The apparatus according to claim 9, comprising:
an AND circuit for receiving the delayed read start signal and the clock pulses;
an OR gate connected to said AND gate, said OR gate having a first output connected to said clock input of said first flip-flop and a second output connected to said clock input of said second flip-flop; and
an AND gate connected to said output of said second flip-flop to said OR gate and to said third means.

* * * * *